United States Patent
Egoshi

(10) Patent No.: US 9,751,425 B2
(45) Date of Patent: Sep. 5, 2017

(54) NAVIGATION DEVICE AND CRUISING RANGE DISPLAY SYSTEM

(75) Inventor: Yasuo Egoshi, Ebina (JP)

(73) Assignee: Clarion Co., Ltd., Saitama-shi (JP)

( * ) Notice: Subject to any disclaimer, the term of this patent is extended or adjusted under 35 U.S.C. 154(b) by 366 days.

(21) Appl. No.: 14/008,224

(22) PCT Filed: Mar. 29, 2012

(86) PCT No.: PCT/JP2012/058408
§ 371 (c)(1),
(2), (4) Date: Sep. 27, 2013

(87) PCT Pub. No.: WO2012/133670
PCT Pub. Date: Oct. 4, 2012

(65) Prior Publication Data
US 2014/0032102 A1 Jan. 30, 2014

(30) Foreign Application Priority Data
Mar. 29, 2011 (JP) .................. 2011-072588

(51) Int. Cl.
*B60L 11/18* (2006.01)
*B60L 15/20* (2006.01)
(Continued)

(52) U.S. Cl.
CPC .......... *B60L 11/1862* (2013.01); *B60K 35/00* (2013.01); *B60L 11/1857* (2013.01);
(Continued)

(58) Field of Classification Search
CPC .............. B60L 11/1862; B60L 11/1857; B60L 15/2045; B60K 35/00; G09B 29/106; G10C 21/3469
See application file for complete search history.

(56) References Cited

U.S. PATENT DOCUMENTS 5,539,318 A   7/1996 Sasaki
5,539,399 A   7/1996 Takahira et al.
(Continued)

FOREIGN PATENT DOCUMENTS

CN   101641606 A   2/2010
CN   101750584 A   6/2010
(Continued)

OTHER PUBLICATIONS

International Search Report dated May 15, 2012 (two (2) pages).
(Continued)

*Primary Examiner* — Jerrah Edwards
*Assistant Examiner* — Kelly D Williams
(74) *Attorney, Agent, or Firm* — Crowell & Moring LLP

(57) ABSTRACT

A navigation device includes: a degradation coefficient determination unit that determines a degradation coefficient representing a degradation level of a battery that supplies a vehicle with electric power; a current location calculation unit that calculates a current location of the vehicle; a vicinity map display unit that displays a vicinity map of the current location of the vehicle on a display screen; a cruising range calculation unit that calculates a first cruising range of the vehicle based on a remaining amount of the battery and a full charge amount of the battery contained in charging information received from the battery; a second cruising range calculation unit that calculates a second cruising range, which is smaller than the first cruising range, based on the degradation coefficient and the first cruising range; and a cruising range display unit that performs a display representing the second cruising range on the vicinity map.

6 Claims, 8 Drawing Sheets

(51) Int. Cl.
  *G01C 21/34* (2006.01)
  *G09B 29/10* (2006.01)
  *B60K 35/00* (2006.01)

(52) U.S. Cl.
  CPC ...... *B60L 15/2045* (2013.01); *G01C 21/3469* (2013.01); *G09B 29/106* (2013.01); *B60K 2350/1076* (2013.01); *B60L 2240/622* (2013.01); *B60L 2250/16* (2013.01); *B60W 2510/248* (2013.01); *Y02T 10/645* (2013.01); *Y02T 10/7005* (2013.01); *Y02T 10/705* (2013.01); *Y02T 10/72* (2013.01); *Y02T 10/7283* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| 2003/0094321 | A1  |        | 5/2003  | Hirata et al.           |
|--------------|-----|--------|---------|-------------------------|
| 2007/0225904 | A1  |        | 9/2007  | Pantalone et al.        |
| 2009/0070052 | A1  | *      | 3/2009  | Taniguchi .......... G01R 31/3651 702/63 |
| 2010/0153038 | A1  |        | 6/2010  | Tomura et al.           |
| 2011/0112781 | A1  | *      | 5/2011  | Anderson .......... G01R 31/3679 702/63 |

FOREIGN PATENT DOCUMENTS

| CN | 101765756 A       | 6/2010  |              |
|----|-------------------|---------|--------------|
| DE | 102009040968 A1 * | 3/2011  | ..... G01C 21/367 |
| EP | 2 172 740 A1      | 4/2010  |              |
| JP | 6-59003 A         | 3/1994  |              |
| JP | 7-85397 A         | 3/1995  |              |
| JP | 7-169510 A        | 7/1995  |              |
| JP | 9-119839 A        | 5/1997  |              |
| JP | 10-319101 A       | 12/1998 |              |
| JP | 2000-292195 A     | 10/2000 |              |
| JP | 2002-202013 A     | 7/2002  |              |
| JP | 2002-247773 A     | 8/2002  |              |
| JP | 2002-340997 A     | 11/2002 |              |
| JP | 2003-153452 A     | 5/2003  |              |
| JP | 2003-164006 A     | 6/2003  |              |
| JP | 2004-317952 A     | 11/2004 |              |
| JP | 2007-195312 A     | 8/2007  |              |
| JP | 2008-24124 A      | 2/2008  |              |
| JP | 2008-278624 A     | 11/2008 |              |
| JP | 2010-139386 A     | 6/2010  |              |
| JP | 2011-217509 A     | 10/2011 |              |

OTHER PUBLICATIONS

Extended European Search Report issued in counterpart European Application No. 12764309.6 dated Feb. 8, 2016 (six (6) pages).
Japanese Office Action issued in counterpart Japanese Application No. 2013-507732 dated Nov. 17, 2015 with English-language translation (seven (7) pages).
Chinese Office Action issued in counterpart Chinese Application No. 201280015705.X dated Apr. 11, 2016 with English-language translation (twenty-two (22) pages).

* cited by examiner

FIG.4

| DATE AND TIME OF RECORDING CONTAINED IN CHARGING INFORMATION | DEGRADATION COEFFICIENT |
|---|---|
| PRESENT DATE AND TIME TO 2 DAYS BEFORE PRESENT DATE AND TIME | 0.98 |
| 2 DAYS BEFORE PRESENT DATE AND TIME TO 5 DAYS BEFORE PRESENT DATE AND TIME | 0.95 |
| 5 DAYS BEFORE PRESENT DATE AND TIME TO 10 DAYS BEFORE PRESENT DATE AND TIME | 0.92 |
| 10 DAYS BEFORE PRESENT DATE AND TIME TO 15 DAYS BEFORE PRESENT DATE AND TIME | 0.90 |
| ... | ... |

← 41    ← 42

NAVIGATION DEVICE AND CRUISING RANGE DISPLAY SYSTEM

TECHNICAL FIELD

The present invention relates to a navigation device and to a cruising range display system that displays a cruising range of a vehicle that includes the navigation device on a display screen.

BACKGROUND ART

Patent literature 1 discloses an invention relating to a remaining amount detection device that grasps a degradation level of a battery to be put on board in an electric vehicle based on an internal resistance value of the battery while the battery is being charged and detects a remaining amount of the battery taking into consideration the grasped degradation level.

CITATION LIST

Patent Literature

Patent Literature 1: JP H07-169510 A.

SUMMARY OF THE INVENTION

Technical Problem

The invention disclosed in the patent literature 1 fails to allow a driver of an electric vehicle or the like to visually confirm the cruising range that is calculated taking into consideration the degradation of the batteries.

Solution to Problem

According to the 1st aspect of the present invention, a navigation device, comprises: a degradation coefficient determination unit that determines a degradation coefficient representing a degradation level of a battery that supplies a vehicle with electric power for driving; a current location calculation unit that calculates a current location of the vehicle; a vicinity map display unit that displays a vicinity map showing a vicinity of the current location of the vehicle on a display screen; a cruising range calculation unit that calculates a first cruising range of the vehicle based on a remaining amount of the battery and a full charge amount of the battery, which is a charging amount when the battery is in full charge, contained in charging information received from the battery; a second cruising range calculation unit that calculates a second cruising range, which is smaller than the first cruising range, based on the degradation coefficient and the first cruising range; and a cruising range display unit that performs a predetermined display representing the second cruising range on the vicinity map.

According to the 2nd aspect of the present invention, in the navigation device according to the 1st aspect, it is preferred that the cruising range display unit displays a circle having a radius corresponding to the second cruising range as the predetermined display on the vicinity map.

According to the 3rd aspect of the present invention, in the navigation device according to the 2nd aspect, it is preferred that the cruising range display unit displays a first circle having a radius corresponding to the first cruising range and a second circle having a radius corresponding to the second cruising range as the predetermined display on the vicinity map.

According to the 4th aspect of the present invention, in the navigation device according to the 3rd aspect, it is preferred that centers of the first circle and the second circle represent each a current location of the vehicle.

According to the 5th aspect of the present invention, in the navigation device according to the 4th aspect, it is preferred that the cruising range display unit displays a ring-shaped region between the first circle and the second circle in a display mode different from a display mode for a region on the display screen other than the ring-shaped region.

According to the 6th aspect of the present invention, in the navigation device according to the 5th aspect, it is preferred that the cruising range display unit displays an inside of the second circle in a display mode different from any of a display mode in which the ring-shaped region is displayed and a display mode in which an outside of the first circle is displayed.

According to the 7th aspect of the present invention, in the navigation device according to any one of the 1st to 6th aspects, it is preferred that: the battery is included by a battery unit; the battery unit calculates the full charge amount and records the calculated full charge amount together with date and time of recording thereof, and the battery unit transmits the calculated full charge amount and the date and time of recording thereof recorded therein to the navigation device; the navigation device further includes a charging information reception unit that receives the full charge amount and the date and time of recording thereof from the battery unit; and the degradation coefficient determination unit determines the degradation coefficient based on the date and time of recording and present date and time.

According to the 8th aspect of the present invention, in the navigation device according to the 7th aspect, it is preferred that the navigation device further comprises a degradation coefficient correction unit that corrects the degradation coefficient based on the full charge amount contained in the charging information that was received by the charging information reception unit in the past and on the full charge amount contained in the charging information that is currently received by the charging information reception unit.

According to the 9th aspect of the present invention, a cruising range display system comprises: a battery unit including a battery that supplies a vehicle with electric power for driving; and a navigation device that is to be connected to the vehicle, wherein: the battery unit or the navigation device includes a degradation coefficient determination unit that determines a degradation coefficient that represents a degradation level of the battery; the battery unit includes a remaining amount calculation unit that calculates a remaining amount of the battery, a full charge amount calculation unit that calculates a full charge amount of the battery, an amount recording unit that records the full charge amount of the battery calculated by the full charge amount calculation unit, and a charging information transmission unit that transmits the remaining amount of the battery calculated by the remaining amount calculation unit and the full charge amount recorded by the amount recording unit as charging information to the navigation device; and the navigation device includes a current location calculation unit that calculates a current location of the vehicle, a vicinity map display unit that displays a vicinity map showing a vicinity of the current location of the vehicle on a display screen, a charging information reception unit that receives the charging information transmitted by the charging information transmission unit, a cruising range calculation unit that calculates a first cruising range of the vehicle based on the remaining amount and the full charge amount contained in the charging information received by the charging information reception unit, a second cruising range calculation unit that calculates a second cruising range, which is smaller than the first cruising range, based on the degradation coefficient and the first cruising range, and a cruising range display unit that displays a predetermined display representing the second cruising range on the vicinity map.

According to the 10th aspect of the present invention, in the cruising range display system according to the 9th aspect, it is preferred that the cruising range display unit displays a circle having a radius corresponding to the second cruising range as the predetermined display on the vicinity map.

According to the 11th aspect of the present invention, in the cruising range display system according to the 10th aspect, it is preferred that the cruising range display unit displays a first circle having a radius corresponding to the first cruising range and a second circle having a radius corresponding to the second cruising range as the predetermined display on the vicinity map.

According to the 12th aspect of the present invention, in the cruising range display system according to the 11th aspect, it is preferred that centers of the first circle and the second circle represent each a current location of the vehicle.

According to the 13th aspect of the present invention, in the cruising range display system according to the 12th aspect, it is preferred that the cruising range display unit displays a ring-shaped region between the first circle and the second circle in a display mode different from a display modes for a region on the displace screen other than the ring-shaped region.

According to the 14th aspect of the present invention, in the cruising range display system according to the 13th aspect, it is preferred that the cruising range display unit displays an inside of the second circle in a display mode different from any of a display mode in which the ring-shaped region is displayed and a display mode in which an outside of the first circle is displayed.

According to the 15th aspect of the present invention, in the cruising range display system according to any one of the 9th to 14th aspects, it is preferred that: the amount recording unit records the full charge amount calculated by the full charge amount calculation unit together with date and time of recording thereof; the charging information transmission unit transmits charging information containing the date and time of recording to the navigation device; and the degradation coefficient determination unit determines is included by the navigation device and determines the degradation coefficient based on the date and time of recording and present date and time.

According to the 16th aspect of the present invention, in the cruising range display system according to the 15th aspect, it is preferred that the cruising range display system further comprises a degradation coefficient correction unit that corrects the degradation coefficient based on the full charge amount contained in the charging information that was received by the charging information reception unit in the past and on the full charge amount contained in the charging information that is currently received by the charging information reception unit.

Advantageous Effect of the Invention

According to the present invention, the cruising range that is calculated taking into consideration the degradation of the batteries can be easily confirmed visually by the driver of an electric vehicle or the like.

BRIEF DESCRIPTION OF THE DRAWINGS

FIG. 4 presents a diagram showing a correspondence table indicating an example of correspondence relationship between date and time at which the battery unit recorded a measured value of the full charging amount and a degradation coefficient;

DESCRIPTION OF EMBODIMENTS

Figure 1:
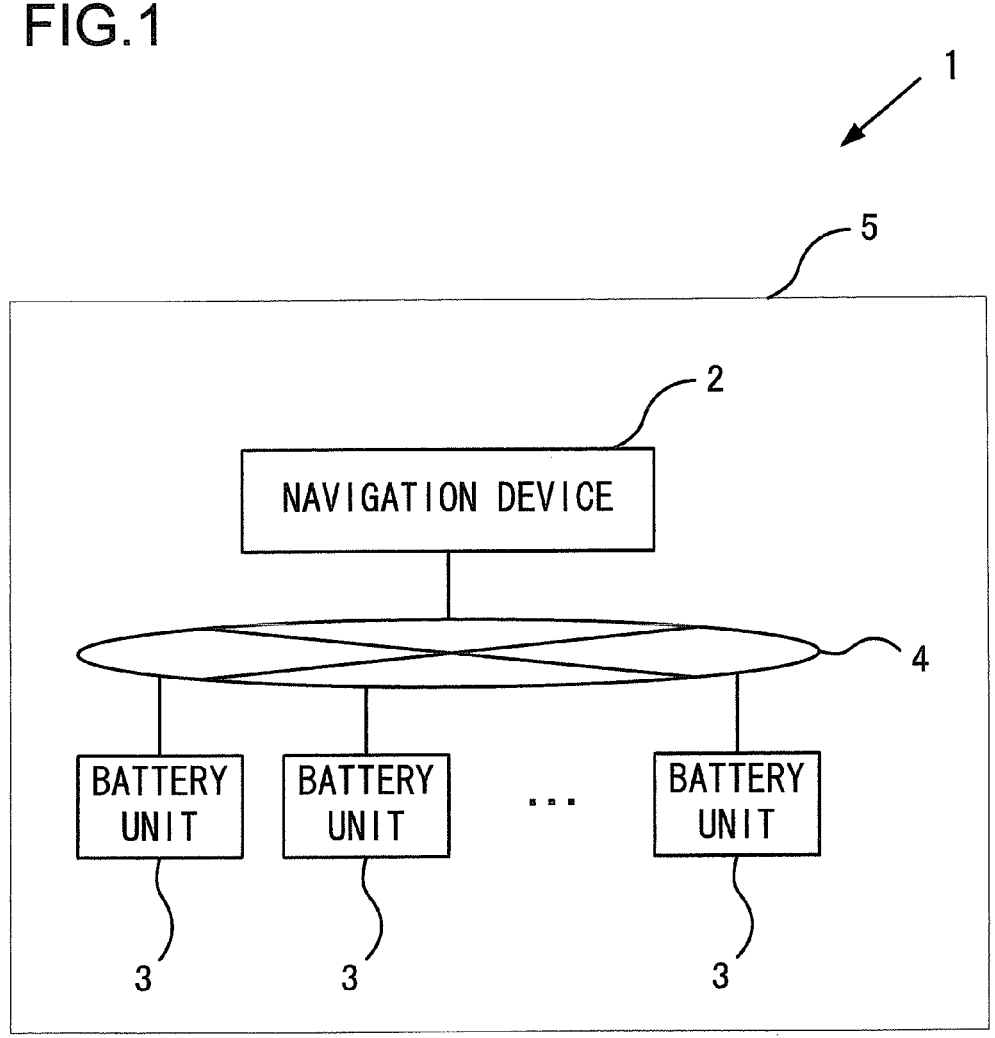
FIG. 1 presents an example of a configuration block diagram showing a cruising range display system according to an embodiment of the present invention.

FIG. 1 presents a block diagram showing an example of the configuration of a cruising range display system according to an embodiment of the present invention. The cruising range display system 1 shown in FIG. 1 includes a navigation device 2 and one or more battery units 3. The navigation device 2 is connected to a CAN (Controller Area Network) 4 of a vehicle 5. The one or more battery units 3 are put on-board in the vehicle 5 and are connected to the CAN 4. The navigation device 2 and the one or more battery units 3 can communicate with each other through the CAN 4.

Figure 2:
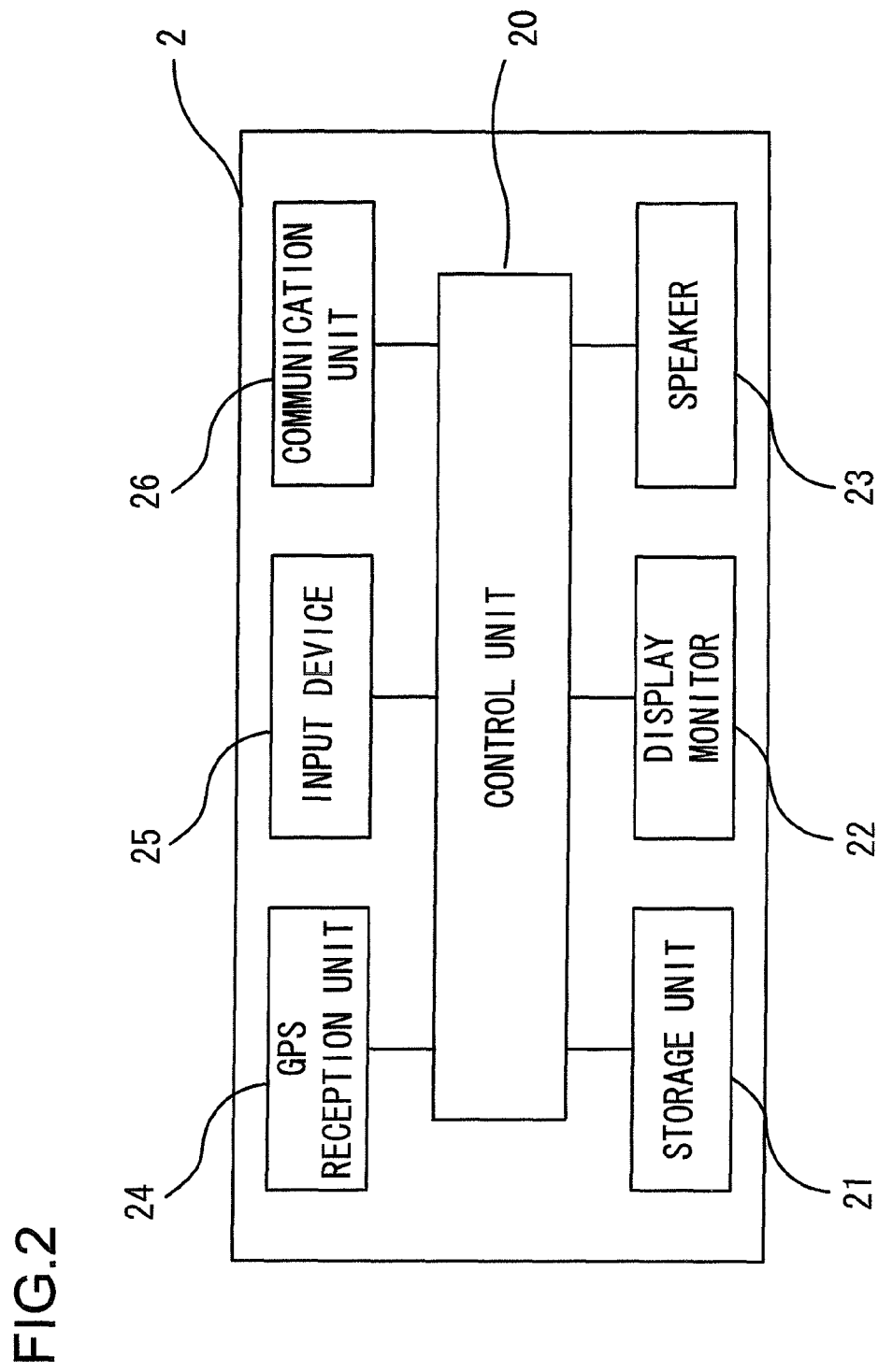
FIG. 2 presents a block diagram showing an example of the configuration of a navigation device according to an embodiment of the present invention.

FIG. 2 presents a configuration block diagram showing an example of the configuration of the navigation device 2. The navigation device 2 includes a control unit 20, a storage unit 21, a display monitor 22, a speaker 23, a GPS reception unit 24, an input device 25, and a communication unit 26.

The control unit 20 is constituted by a microprocessor, various types of peripheral circuits, RAM, and ROM and so on. The control unit 20 controls each component of the navigation device 2 to execute known processing such as route search processing, route guide processing or the like.

The storage unit 21 includes a hard disk drive, a solid state drive or the like and has a non-volatile storage region. The storage unit 21 stores various types of image data such as map data, icon and the like, voice data and so on.

The display monitor 22 is constituted by a liquid crystal monitor or the like. According to the control by the control unit 20, the display monitor 22 displays various types of operating menus and a vicinity map and so on. The speaker 23 outputs sounds such as voice guidance in route guide processing and various types of music.

The GPS reception unit 24 receives GPS signals transmitted from GPS satellites and outputs them to the control unit 20. The GPS signals include, for example, time data from an atomic clock on board in the GPS satellites. The control unit 20 can use the time data contained in the GPS signals to calculate current location of the vehicle 5 and present time and calculate a travel distance of the vehicle 5.

The input device 25 is constituted by various types of switches, an operation panel, a remote control, and a touch panel integrated with the display monitor 22 and so on. The user can operate the navigation device 2 or input various types of information by using the input device 25.

The communication unit 26 can be connected to the CAN 4. The communication unit 26 receives information transmitted from the battery units 3 and transfers the received information to the control unit 20.

Figure 3:
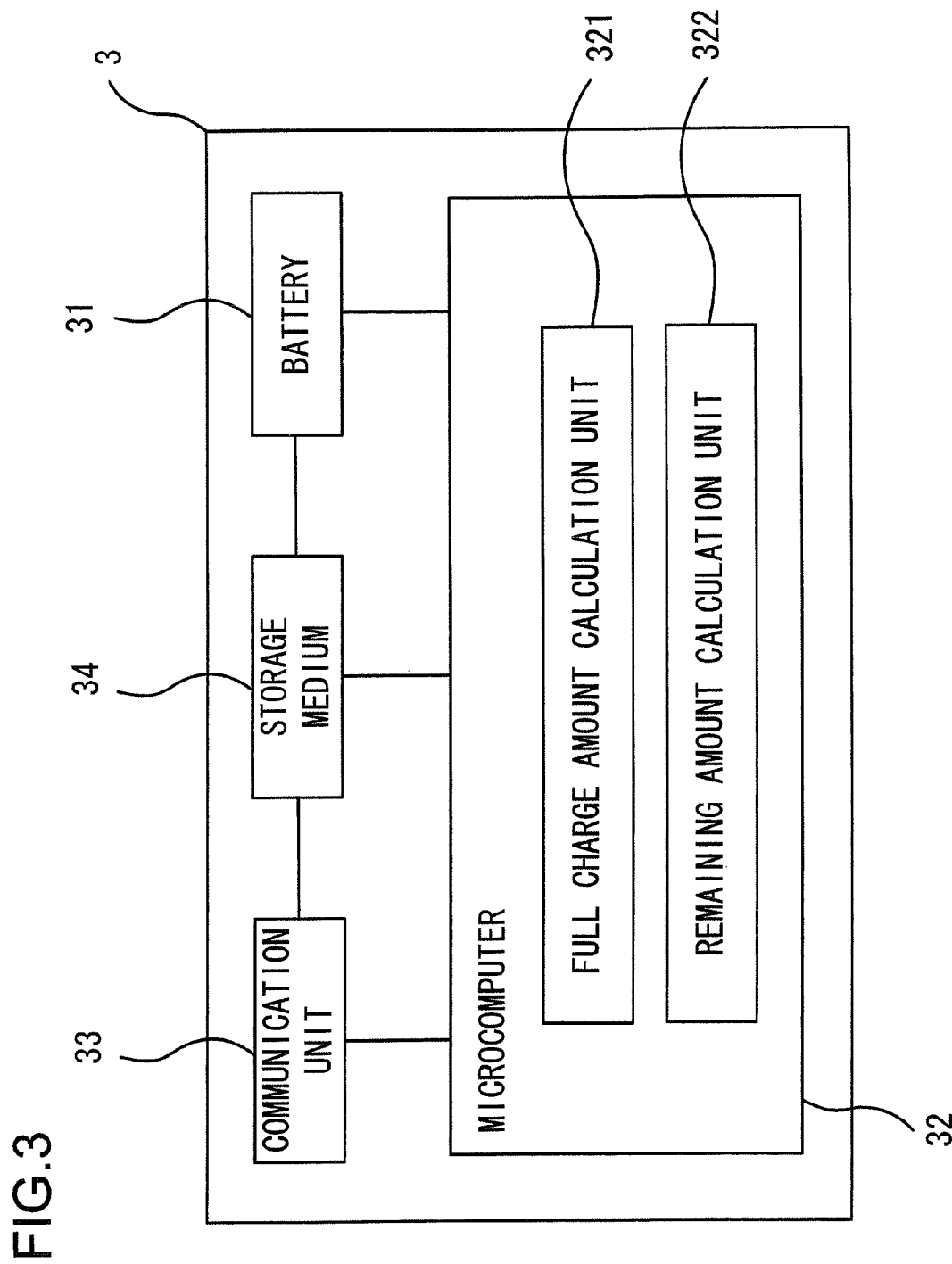
FIG. 3 presents a block diagram showing an example of the configuration of a battery unit according to an embodiment of the present invention.

FIG. 3 presents a configuration block diagram showing an example of the configuration of the battery unit 3. The battery unit 3 includes a battery 31, a microcomputer 32, a communication unit 33, and a storage medium 34. The battery 31 is a source of electric energy supply for the vehicle 5 that is equipped with the battery unit 3. The battery unit 3 supplies the electric power of the battery 31 to the vehicle 5. The microcomputer 32 detects an output current and an output voltage of the battery 31 and generates information relating to the charging amount of the battery 31 based on them. The communication unit 33 transmits the information relating to the charging amount of the battery 31 generated by the microcomputer 32 to the navigation device 2 through the CAN 4. The storage medium 34, which is a non-volatile storage medium such as a flash memory, stores the information relating to charging amount of the battery 31.

The microcomputer 32 detects the output voltage of the battery 31 and determines whether or not the battery 31 has reached a discharge-completed state based on the result of the detection. For example, it may be configured such that if the output voltage of the battery 31 has reached 1 V or less, the microcomputer 32 determines that a discharge-completed state has been reached. The microcomputer 32 determines that the battery 31 has reached a full charge state by a known fixed current-fixed voltage charging method or the like.

The microcomputer 32 includes a full charge amount calculation unit 321 and a remaining amount calculation unit 322. The full charge amount calculation unit 321 calculates a charging amount that is deemed to be a full charging amount when the battery 31 has reached the discharge-completed voltage. The full charge amount calculation unit 321 integrates currents that the battery 31 has output during a time from its full charged state to its discharge-completed state. The integrated value of the currents output from the battery 31 is called a "currently-consumed amount". The full charge amount calculation unit 321 records the currently-consumed amount of the battery 31 when the battery 31 has reached a discharge-completed state as a full charging amount or a full charging capacity of the battery 31 in the storage medium 34. On this occasion, the full charging amount is recorded in the storage medium 34 together with the date and time of its recording. Note that the full charge amount calculation unit 321 may be configured to calculate a full charging amount when the battery 31 has been fully charged and store it in the storage medium 34. In this case, the full charge amount calculation unit 321 integrates currents in a period while the battery 31 transitions from a discharge-completed state to a full charge state.

The full charge amount calculation unit 321 renews, if any, an already recorded full charging amount in the storage medium 34. The full charge amount calculation unit 321 recalculates the currently-consumed amount from the beginning, if the battery 31 has been fully charged. The full charge amount calculation unit 321 recalculates the currently-consumed amount from the beginning, if the battery 31 is charged before it has reached the discharge-completed state.

The full charge amount calculation unit 321 does not renew the full charging amount stored in the storage medium 34, if the battery 31 is charged to the full charge state before it has reached the discharge-completed state. On the other hand, if charge and discharge are repeated, the battery 31 is degraded. Accordingly, the full charging amount recorded in the storage medium 34 becomes less credible as time elapses without renewal of the full charging amount.

The remaining amount calculation unit 322 calculates the remaining amount of the battery 31 based on the currently-consumed amount of the battery 31 and the full charging amount stored in the storage medium 34. For example, the calculation may be conducted by subtracting currently-consumed amount from the full charging amount of the battery 31 and dividing the obtained result by the full charging amount to obtain a value expressed in percentage.

The microcomputer 32, each time when it calculates the remaining amount of the battery 31, transmits information containing the full charging amount of the battery 31 recorded in the storage medium 34 and its date and time of recording as well as the remaining amount calculated by the microcomputer 32 through the communication unit 33 to the navigation device 2. The information that the microcomputer 32 of the battery unit 3 transmits to the navigation device 2 is called "charging information". The control unit 20 of the navigation device 2 receives the charging information through the communication unit 26. The control unit 20 stores the received charging information in the storage unit 21.

The control unit 20 of the navigation device 2 calculates the cruising range (cruising distance or travel continuation possible distance) of the vehicle 5 based on the remaining amount and the full charging amount of the battery 31 contained in the received charging information. The control unit 20 calculates a corrected cruising range of the battery 31 by multiplying the cruising range by a degradation (deterioration) coefficient (factor) that is based on the date and time of recording contained in the received charging information.

When charge and discharge of the battery 31 is repeated, the battery 31 has a decreased full charging amount and a decreased cruising range. The earlier or older the date and time of recording when the full charging amount of the battery 31 was recorded in the storage medium 34 is, the less credible becomes the value of the full charging amount contained in the charging information. The degradation coefficient or deterioration coefficient is a numerical value that is used for calculating a distance at which the vehicle can continue running with sufficiently high probability when the credibility of the full charging amount of the battery 31 contained in the charging information is low. The value of the degradation coefficient is smaller than 1.

FIG. 4 presents a diagram showing an example of a correspondence table indicating a correspondence relationship between the date and time at which the battery unit 3 recorded full charging information in the storage medium 34 and the degradation coefficient. The correspondence table exemplified in FIG. 4 is stored as a lookup table in the storage unit 21 of the navigation device 2, from which table the degradation coefficient corresponding to the date and time of recording contained in the received charging information is read out under the control of the control unit 20.

As shown in FIG. 4, there are a row 41 that includes items obtained by classifying the dates and times of recording contained in the charging information received by the navigation device 2 and a row 42 that includes degradation coefficients corresponding to the respective items in the row 41. If the date and time of recording contained in the received charging information is, for example, the date and time 3 days before the present date and time, the degradation coefficient "0.95" in the row 42 that corresponds to the item of "2 to 5 days before the present date and time" in the row 41 is read out by the control unit 20.

The degradation coefficient in FIG. 4 may be renewed by a degradation coefficient that is calculated based on the currently received charging information and the charging information that has been stored in the storage unit 21 in the past. For example, the control unit 20 calculates a degradation coefficient (b1/b2) by dividing a full charge amount b1 (for example, 60 Ah) contained in the currently received charging information by the full charging amount b2 (for example, 65 Ah) stored in the storage unit 21 in the past. Then, the control unit 20 calculates a difference between the date and time of recording contained in the currently received charging information and the date and time of recording in the charging information that was stored in the storage unit 21 in the past and performs correction of the degradation coefficient in FIG. 4 corresponding to the difference by renewing it by the calculated degradation coefficient b1/b2.

Figure 5:
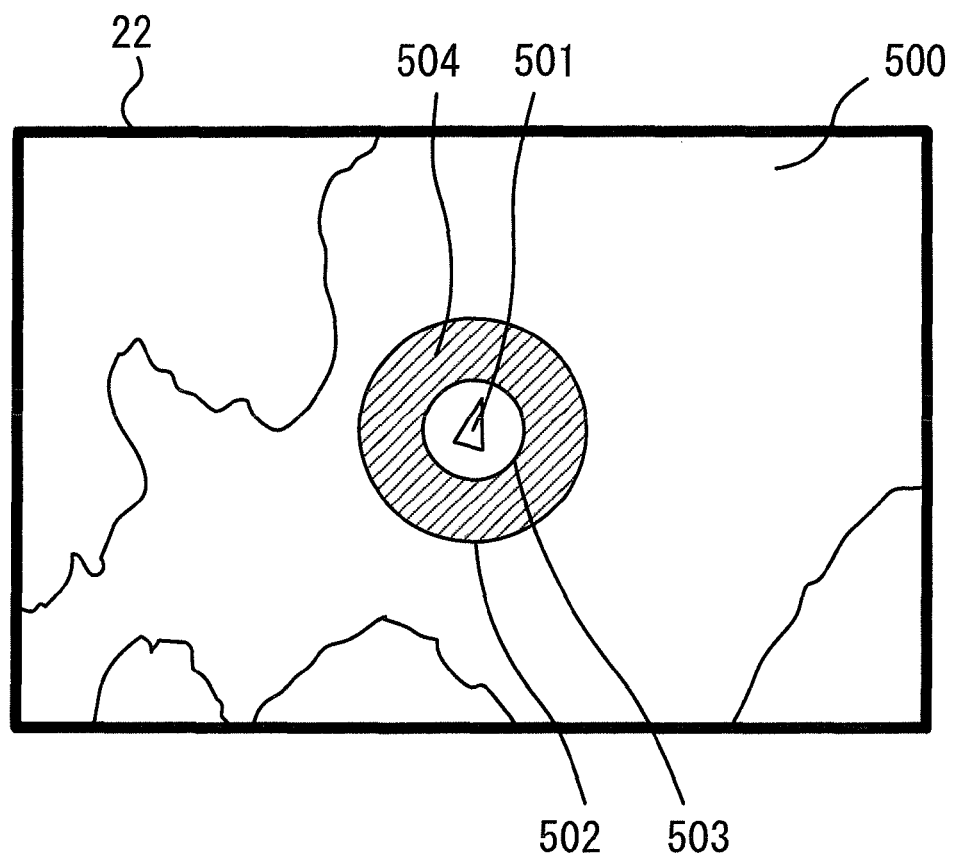
FIG. 5 presents a diagram showing an example of a display screen that displays a cruising range together with a vicinity map.

After the control unit 20 of the navigation device 20 calculates a cruising range and a corrected cruising range, it controls the display monitor 22 to display thereon circle marks corresponding to the distances, respectively. The circle marks are displayed on a vicinity map around the vicinity of current location of the vehicle 5 displayed on the display monitor 22. FIG. 5 shows examples of circle marks indicating the cruising range and corrected cruising range displayed on the display monitor 22.

In FIG. 5, a vicinity map 500 around the vicinity of current location of the vehicle 5 is displayed on the display monitor 22. In the center of the display screen of the display monitor 22 is displayed a vehicle mark 501 indicating the current location of the vehicle 5. Then, a first circle mark 502 having a radius corresponding to the cruising range and a second circle mark 503 having a radius corresponding to the corrected cruising range are displayed centering on the current location of the vehicle 5. A ring-shaped display region 504 at a distance equal to or farther than the corrected cruising range and equal to or closer to the cruising range from the current location of the vehicle 5 is displayed in a different display mode than those in which other display regions of the display monitor 22 are displayed. Note that although in FIG. 5, the ring-shaped display region 504 is displayed as hatched, it may be displayed, for example, as painted out with a translucent red color.

The earlier or older the date and time of recording contained in the charging information is, the smaller the corrected cruising range is and the radius of the first circle mark becomes smaller, so that the ring-shaped display region 504 expands. If the battery 31 is degraded to have a decreased full charge amount, the radius of the second circle mark becomes smaller. If the charging information contains a latest full charge amount, the corrected cruising range is substantially equivalent to the cruising range, so that the ring-shaped display region 404 disappears substantially.

Figure 6:
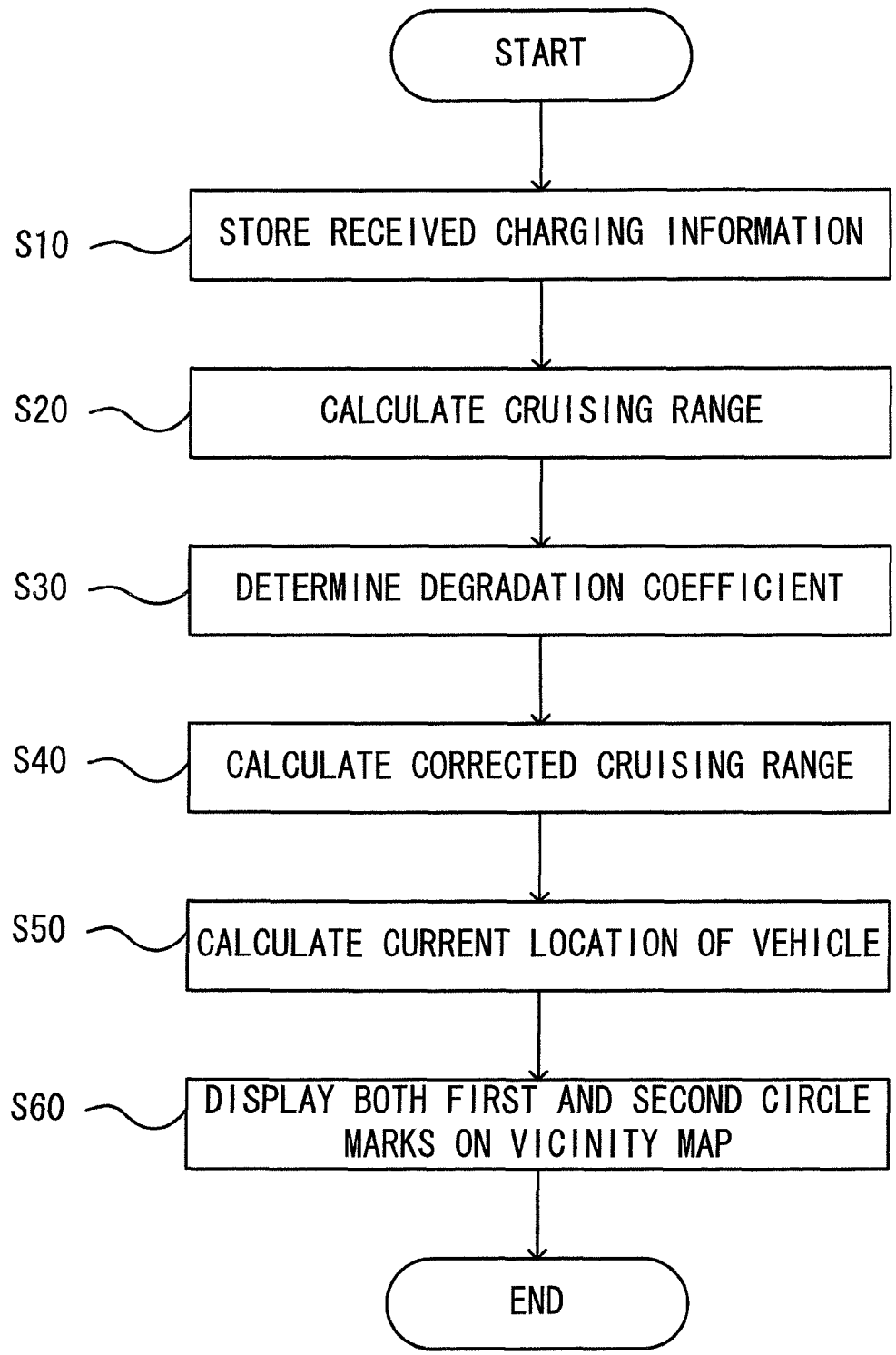
FIG. 6 presents an example of a flowchart relating to display processing of cruising range.

FIG. 6 presents an example of a flowchart showing the flow of processing of displaying circle mark along with the vicinity map by the navigation device 2 based on the cruising range and the corrected cruising range.

In step S10, the control unit 20 stores the charging information received from the battery unit 3 in the storage unit 21. In step S20, the control unit 20 calculates a cruising range based on the value of the full charging amount and the value of remaining amount in the received charging information.

In step S30, the control unit 20 determines a degradation coefficient based on the table in FIG. 4 and based on the date and time of recording contained in the received charging information. In step S40, the control unit 20 calculates a corrected cruising range based on the cruising range calculated in step S20 and the degradation coefficient determined in step S30.

In step S50, the control unit 20 calculates the current location of the vehicle 5 based on the GPS signals. In step S60, the control unit 20 displays a vicinity map around the vicinity of the current location of the vehicle 5 based on the map data and displays on the vicinity map the first circle mark 502 based on the corrected cruising range and the second circle mark 503 based on the cruising range.

According to the embodiment explained above, the following operation and effect can be obtained. The control unit 20 of the navigation device 2 calculates a current location of the vehicle 5 that includes the navigation device 2 based on the GPS signals received by the GPS reception unit 24 (step S50). The control unit 20 displays a vicinity map 500 showing the current location of the vehicle 5 on the display monitor 22. The control unit 20 determines a degradation coefficient representing the degradation level of the battery 31 that supplies electric power for driving to the vehicle 5 (step S30). The control unit 20 calculates the cruising range of the vehicle 5 based on the remaining amount and the full charge amount of the battery 31 (step S20). The control unit 20 calculates a corrected cruising range based on the degradation coefficient and the cruising range (step S40). The control unit 20 displays the second circle mark 503 based on the corrected cruising range on the vicinity map 500 (FIG. 5). With this configuration, the driver of a vehicle such as an electric vehicle can easily confirm visually a corrected cruising range calculated taking the degradation of the battery 31 into consideration. The cruising range display system 1 is equipped with the battery unit 3 including the battery 31 that supplies electric power for driving to the vehicle 5 and the navigation device 2 to be connected to the vehicle 5. The microcomputer 32 of the battery unit 3 includes a remaining amount calculation unit 322 that calculates the remaining amount of the battery 31 and a full charge amount calculation unit 311 that calculates the full charge amount of the battery 31. Then, the battery unit 3 records the full charge amount calculated by the full charge amount calculation unit 311 in the storage medium 34. The battery unit 3 transmits, through the communication unit 33, the remaining amount of the battery 31 calculated by the microcomputer 32, the full charge amount recorded in the storage medium 34 and its date and time of recording as charging information to the navigation device 2. On the other hand, the control unit 20 of the navigation device 2 receives the charging information that the battery unit 3 has transmitted through the communication unit 26. Then, the control unit 20 calculates a cruising range of the vehicle based on the remaining amount and the full charge amount of the battery 31 contained in the received charging information (step S20). The control unit 20 determines a degradation coefficient corresponding to the date and time of recording contained in the received charging information (step S30), and calculates a corrected cruising range based on the determined degradation coefficient and the calculated cruising range (step S40). The control unit 20 calculates the current location of the vehicle 5 that includes the navigation device 2 based on the GPS signals received by the GPS reception unit 24, and displays, based on the map data, the vicinity map 500 around the vicinity of the current location of the vehicle 5 and the second circle mark 503 based on the corrected cruising range on the display monitor 22 (FIG. 5). With this configuration, the driver of a vehicle such as an electric vehicle can easily confirm visually a corrected cruising range calculated taking the degradation of the battery 31 into consideration.

The control unit 20 displays not only the second circle mark 503 but also the first circle mark 502 on the vicinity map 500. The second circle mark 503 and the first circle mark 502 center on the current location of the vehicle 5. The size of the ring-shaped display region 504 between the second circle mark 503 and the first circle mark 502 indicates the degradation level of the battery 31. The second circle mark 503 is depicted as a circle taking a degradation level (learning a lack of a full charge amount) into consideration while the first circle mark 502 is depicted as a circle taking no degradation level into consideration. The user can recognize a risk when he or she drives the vehicle in the ring-shaped display region 504.

The embodiment as explained above can be practiced after it is modified as follows. [1] In the above embodiment, as shown in FIG. 5, the vehicle mark 501, the first circle mark 502 and the second circle mark 503 as well as the vicinity map 500 are displayed on the display monitor 22. The method of representing cruising range and corrected cruising range by circles on the display monitor 22 is not limited to the method exemplified in FIG. 5. For example, it may be configured such that on the vicinity map 500, only the second circle mark 503 is displayed but neither the first circle mark 502 nor the ring-shaped display region 504 is displayed. Alternatively, facility icons that indicate the location of a plug-in station or the like may be displayed along with the vicinity map 500. On this occasion, among the facility icons relating to the plug-in station, those facility icons within the second circle mark 503 may be displayed in a highlighted display mode, for example, by changing the display color therefor.

Figure 7:
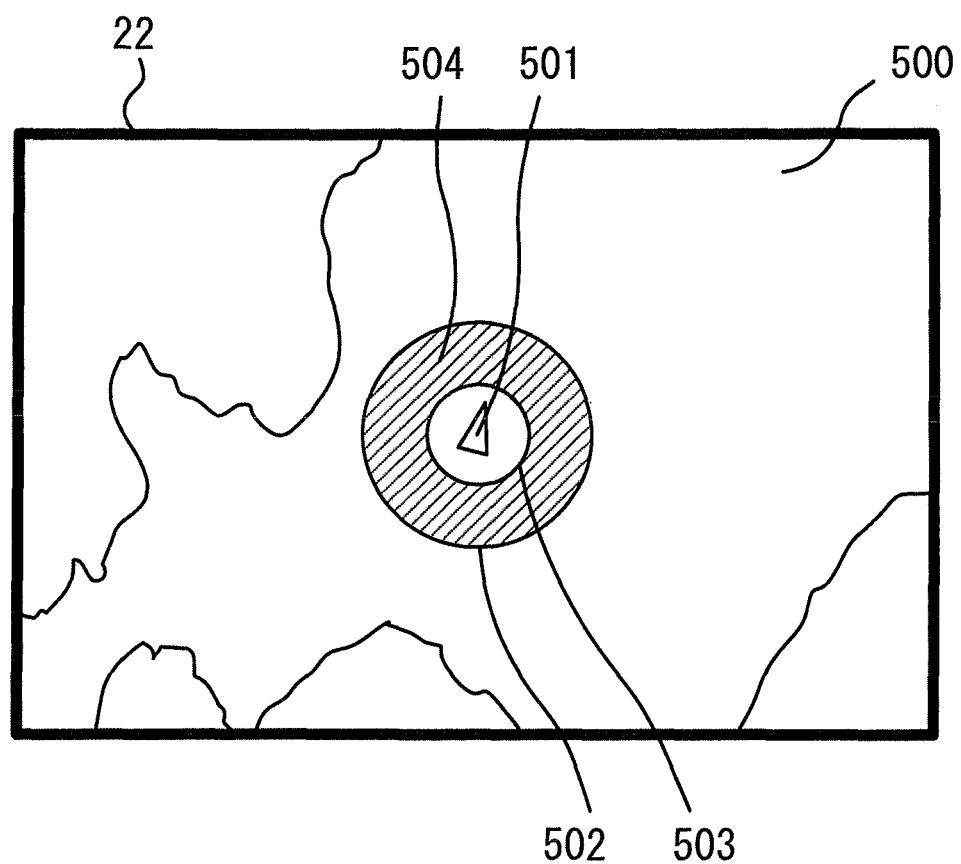
FIG. 7 presents a diagram showing an example of a display screen that displays a cruising range as well as a vicinity map.

Although in FIG. 5, the display mode of the ring-shaped display region 504 is made different from that of the other regions, also a region within the second circle mark 503 may be displayed in a display mode different from those of the other regions as shown in FIG. 7. The display color and line width of the inside of the second circle mark 503 and the inside of the ring-shaped display region 504 may be different from those in the other regions.

Figure 8:
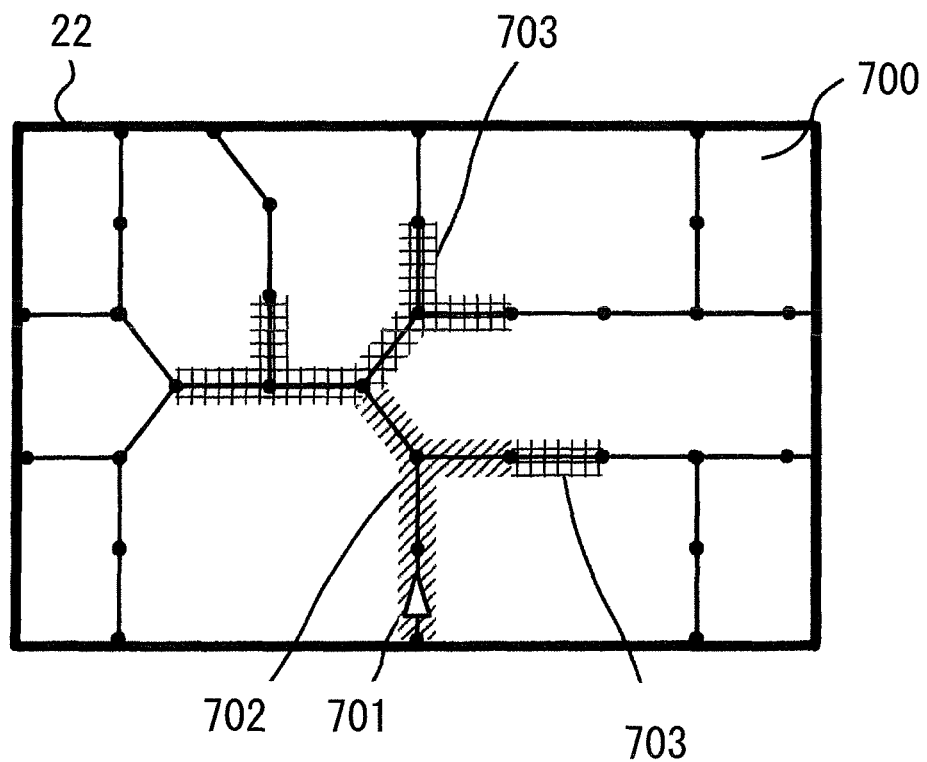
FIG. 8 presents a diagram showing an example of a display screen that displays a cruising range together with a vicinity map.

[2] Although in the above embodiment, the cruising range and the corrected cruising range are represented by circles using the first circle mark 502 and the second circle mark 503, the cruising range and the corrected cruising range may be displayed by other display methods. FIG. 8 presents a diagram showing an example of a display screen that displays a cruising range and a corrected cruising range along a road that extends in a direction in which the vehicle is running. In FIG. 8, a vicinity map 700 around the vicinity of the current location of the vehicle is displayed. The vicinity map 700 is displayed as a network of roads that extends from the current location of the vehicle. At the current location of the vehicle 5 is displayed a vehicle mark 700. In FIG. 8, a region 702 that is hatched with slanting lines highlights a road that is in a range of distance along the road from the current location of the vehicle 5 is equal to or shorter than the corrected cruising range. Also, in FIG. 8, a region 703 that is hatched with grid highlights a road that is in a range of distance along the road from the current location of the vehicle 5 is equal to or longer than the corrected cruising range and is equal to or shorter than the cruising range. With this configuration, the driver can grasp the cruising range more precisely. The length of each road is contained in the map data stored in the storage unit 21.

[3] The storage medium 34 of the battery unit 3 may record therein a rated full charge amount (a rated full charge capacity) b3 of the battery 31. With this configuration, the microcomputer 32 of the battery unit 3 can, when the full charge amount calculation unit 321 calculates full charge amount b4, calculate a ratio b4/b3 of the full charge amount b4 to the rated full charge amount b3 and determine the ratio b4/b3 as a degradation coefficient. The battery unit 3 may be configured to transmit the determined degradation coefficient additionally as a part of the charging information to the navigation device 2. The battery unit may be configured to transmit the rated full charge amount b3 of the battery 31 as a part of the charging amount. The navigation device 2 can receive the degradation coefficient or the rated full charge amount b3 of the battery 31 through the communication unit 26 and use the received information for calculating the corrected cruising range. Note that the rated full charge amount b3 of the battery 31 may be stored in the storage unit 21 of the navigation device 2. In such a case, the control unit 20 can calculate a degradation coefficient based on the full charge amount b1 and the rated full charge amount b3 contained in the charging information received by the control unit 20 through the communication unit 26. The rated full charge amount b3 of the battery 31 may be input in the storage unit 21 in advance by the user by using the input device 25 or may be stored in advance at the time of manufacture or delivery.

[4] The battery unit 3 and the navigation device 2 may be configured to communicate with each other not through the CAN 4 but through wired or wireless communication.

The above explained embodiments and various variation examples are mere examples and the present invention is not limited to them so far as the characteristic features of the invention is not damaged.

The disclosure of the following priority application is incorporated by reference herein: Japanese Patent Application No. 2011-072588 (filed on Mar. 29, 2011).

The invention claimed is:

1. A navigation device, comprising:
   a storage unit that stores a lookup table which includes degradation coefficients each representing credibility of a full charging amount that decreases due to degradation of a battery that supplies a vehicle with electric power for driving;
   a degradation coefficient determination unit that determines a degradation coefficient among the degradation coefficients by using the lookup table stored in the storage unit;
   a current location calculation unit that calculates a current location of the vehicle;
   a vicinity map display unit that displays a vicinity map showing a vicinity of the current location of the vehicle on a display screen;
   a cruising range calculation unit that calculates a first cruising range of the vehicle based on a remaining amount of the battery and a full charge amount of the battery, which is a charging amount when the battery is in full charge, contained in charging information received from a battery unit that includes the battery;

a second cruising range calculation unit that calculates a second cruising range, which is smaller than the first cruising range, based on the degradation coefficient and the first cruising range; and a cruising range display unit that performs a predetermined display representing the second cruising range on the vicinity map, wherein the cruising range display unit displays the first cruising range and the second cruising range along a road that extends from the current location of the vehicle on the vicinity map, the battery is included by a battery unit;

the battery unit calculates the full charge amount and records the calculated full charge amount together with date and time of recording thereof, and the battery unit transmits the calculated full charge amount and the date and time of recording recorded therein to the navigation device;

the navigation device further includes a charging information reception unit that receives the full charge amount and the date and time of recording from the battery unit;

the degradation coefficients included in the lookup table are determined according to elapsed time from the date and time of recording; and the degradation coefficient determination unit determines the degradation coefficient by using the lookup table based on the date and time of recording and present date and time.

2. The navigation device according to claim 1, wherein:

the cruising range display unit displays a first road having a first range of distance along the road from the current location of the vehicle that is shorter than the second cruising range, with a first display form, on the vicinity map; and the cruising range display unit displays a second road having a second range of distance along the road from the current location of the vehicle that is longer than the second cruising range and is shorter than the first cruising range, with a second display form which is different from the first display form, on the vicinity map.

3. The navigation device according to claim 1, further comprising:

a degradation coefficient correction unit that corrects the degradation coefficient based on the full charge amount contained in the charging information that was received by the charging information reception unit in the past and on the full charge amount contained in the charging information that is currently received by the charging information reception unit.

4. A cruising range display system, comprising:

a battery unit including a battery that supplies a vehicle with electric power for driving; and a navigation device that is to be connected to the vehicle, wherein:

the battery unit or the navigation device includes a storage unit that stores a lookup table which includes degradation coefficients each representing credibility of a full charging amount that decreases due to degradation of the battery;

a degradation coefficient determination unit that determines a degradation coefficient among the degradation coefficients by using the lookup table stored in the storage unit;

the battery unit includes a remaining amount calculation unit that calculates a remaining amount of the battery, a full charge amount calculation unit that calculates a full charge amount of the battery, an amount recording unit that records the full charge amount of the battery calculated by the full charge amount calculation unit, and a charging information transmission unit that transmits the remaining amount of the battery calculated by the remaining amount calculation unit and the full charge amount recorded by the amount recording unit as charging information to the navigation device; and the navigation device includes a current location calculation unit that calculates a current location of the vehicle, a vicinity map display unit that displays a vicinity map showing a vicinity of the current location of the vehicle on a display screen, a charging information reception unit that receives the charging information transmitted by the charging information transmission unit, a cruising range calculation unit that calculates a first cruising range of the vehicle based on the remaining amount and the full charge amount contained in the charging information received by the charging information reception unit, a second cruising range calculation unit that calculates a second cruising range, which is smaller than the first cruising range, based on the degradation coefficient and the first cruising range, and a cruising range display unit that displays a predetermined display representing the second cruising range on the vicinity map, wherein the cruising range display unit displays the first cruising range and the second cruising range along a road that extends from the current location of the vehicle on the vicinity map, the amount recording unit records the full charge amount calculated by the full charge amount calculation unit together with date and time of recording thereof;

the charging information transmission unit transmits charging information containing the date and time of recording to the navigation device;

the degradation coefficients included in the lookup table are determined according to elapsed time from the date and time of recording; and the degradation coefficient determination unit is included by the navigation device and determines the degradation coefficient by using the lookup table based on the date and time of recording and present date and time.

5. The cruising range display system according to claim 4, wherein the cruising range display unit displays a first road having a first range of distance along the road from the current location of the vehicle that is shorter than the second cruising range, with a first display form, on the vicinity map; and the cruising range display unit displays a second road having a second range of distance along the road from the current location of the vehicle that is longer than the second cruising range and is shorter than the first cruising range, with a second display form which is different from the first display form, on the vicinity map.

6. The cruising range display system according to claim 4, further comprising:
a degradation coefficient correction unit that corrects the degradation coefficient based on the full charge amount contained in the charging information that was received by the charging information reception unit in the past and on the full charge amount contained in the charging information that is currently received by the charging information reception unit.

* * * * *